June 23, 1970 J. F. DILLON, JR 3,516,726
OPTICAL DEVICES WITH ZERO LINEAR MAGNETIC BIREFRINGENCE
Filed Feb. 8, 1968
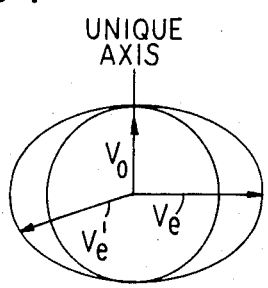
FIG 1
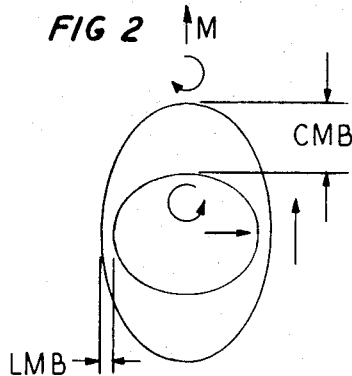
FIG 2
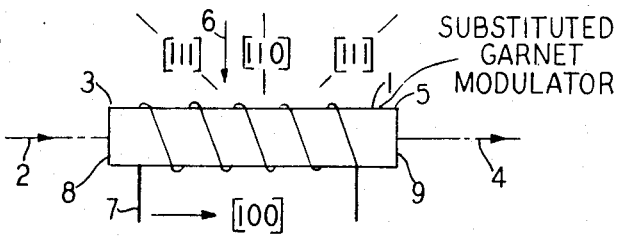
FIG. 3
FIG. 4
| RARE EARTH | 77°K | | 300°K | |
|---|---|---|---|---|
| | $R_{111}$ | $R_{100}$ | $R_{111}$ | $R_{100}$ |
| SAMARIUM | 1.43 | -2.30 | -0.43 | -0.80 |
| EUROPIUM | -2.4 | -3.53 | -1.0 | -1.02 |
| GADOLINIUM | -0.86 | -0.61 | -0.50 | -0.43 |
| TERBIUM | -8.3 | +7.1 | -0.62 | -0.082 |
| DYSPROSIUM | 11.25 | | 0.76 | 0.218 |
| HOLMIUM | 1.95 | +2.38 | -0.46 | 0.246 |
| ERBIUM | -0.43 | -0.64 | -0.53 | -0.42 |
| THULIUM | -0.28 | -1.57 | -0.55 | -0.57 |
| YTTRIUM | -0.83 | -0.61 | -0.50 | -0.44 |
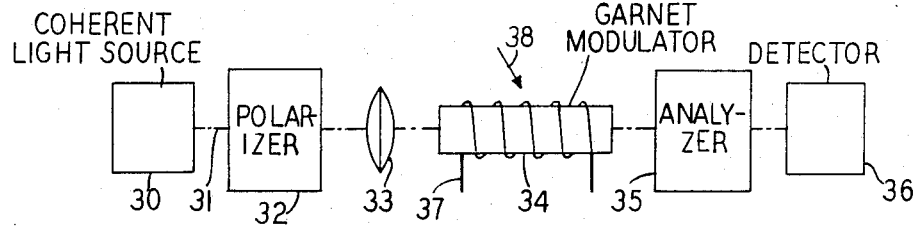
FIG. 5
INVENTOR
*J. F. DILLON, JR.*
BY *Kenneth W Mateer*
ATTORNEY

United States Patent Office 3,516,726
Patented June 23, 1970

---

3,516,726
OPTICAL DEVICES WITH ZERO LINEAR MAGNETIC BIREFRINGENCE
Joseph F. Dillon, Jr., Morris Township, Morris County, N.J., assignor to Bell Telephone Laboratories, Incorporated, Murray Hill and Berkeley Heights, N.J., a corporation of New York
Filed Feb. 8, 1968, Ser. No. 703,956
Int. Cl. G02f 1/22
U.S. Cl. 350—151                                3 Claims

ABSTRACT OF THE DISCLOSURE

Magnetically-controlled optical devices using magneto-optical materials exhibiting zero linear magnetic birefringence (LMB). The normal LMB is compensated by substitution, into the material lattice, of appropriate amounts of rare earth elements having negative retardation coefficients.

---

BACKGROUND OF THE INVENTION

Field of the invention

This invention relates to optical devices and, more particularly, to magnetically-controlled optical devices exhibiting zero linear magnetic birefringence.

Description of the prior art

The invention of the laser, the first coherent light source, less than a decade ago, immediately suggested a number of exciting applications. Many of these have been since demonstrated and some have found their way into commercial use. Among the latter are microscale fabrication techniques, detailed surgery, and Raman spectroscopy. However, one of the most exciting uses of all, communications, is still in its infancy.

To the communications engineer, the laser was a much higher frequency and, therefore, a much greater bandwidth carrier. It was readily appreciated that the new bandwidth so made available was easily capable of carrying all intelligence, sound and video included, being transmitted in the United States. Of course, it was immediately apparent that realization of such a system would require development of modulating and demodulating means. Activity directed to this goal has grown rapidly in intensity. Other uses of optical modulators are also of interest. Examples include use in optical delay lines such as the folded line described in 4 Applied Optics 883 (August, 1965).

At this time there are many modulating arrangements which have been demonstrated, of which the more important depend on electro-optic or magneto-optic interactions.

Initially, magneto-optic modulators did not receive as wide attention as did electro-optic modulators, principally because it had been recognized that effective modulation based on this interaction requires a saturable magnetic material, either ferromagnetic or ferrimagnetic. The number of such materials available with sufficient transparency to permit transmission of the light energy to be modulated is limited. Of the materials which have been seriously considered, chromium tribromide, which must be utilized well below its Curie point of about 32° K., is promising, but development is hampered by poor physical qualities which made adequate grinding and polishing very difficult. Other saturable magnetic materials having the requisite transparency have been difficult to produce (e.g., europium oxide) or have impractically low Curie temperatures (such as the 2° K. transition for gadolinium trichloride).

One of the more significant recent discoveries in the field of magnetic materials was that of the magnetic garnets with properties suitable for use at infrared and visible light frequencies. As the interest has increased in the use of garnet materials in optical devices, however, the presence of a birefringent effect between linear polarizations propagating parallel and perpendicular to the magnetization has become increasingly troublesome. Though typically small, this linear magnetic birefringence (LMB) is readily detectable and, in fact has been used in crystallographic identification and orientation procedures. In optical devices in which the magnetization is at an angle to the propagation direction, however, the presence of LMB causes the linearly-polarized wave to become elliptical, an undesirable effect in such arrangements.

It is, therefore, the object of this invention to eliminate the linear magnetic birefringence associated with magneto-optic materials, such as garnets.

SUMMARY OF THE INVENTION

In accordance with the principles of the present invention, it has been discovered that the retardation coefficients associated with certain rare earth ions in a garnet structure exhibit a positive sense while certain other rare earth ions in such a structure exhibit a negative sense. When the iron garnet includes a rare earth, such as yttrium, as the primary rare earth ion, the linear magnetic birefringence can be compensated by intralattice substitution of one or more selected secondary rare earth ions.

Such compensated materials then can be used in devices in which the magnetization is along general directions without the undesirable effects of linear magnetic birefringence.

BRIEF DESCRIPTION OF THE DRAWINGS

The above object of the invention, together with various other attributes and advantages, can be more readily understood from reference to the accompanying drawing, and to the detailed description thereof which follows:

In the drawing:

FIGS. 1 and 2 are wave normal velocity surface diagrams for a uniaxial crystal and a "cubic" magnetic crystal, respectively;

FIG. 3 is a schematic view of a light modulating element in accordance with the principles of the invention;

FIG. 4 is a table of wave retardations for yttrium iron garnet and certain of the rare earth iron garnets; and FIG. 5 is a schematic block representation of a light system using the element of FIG. 3.

DETAILED DESCRIPTION

Referring now more particularly to FIG. 1, there are shown the wave normal velocity surfaces for a uniaxial crystal in which the extraordinary velocity $v_e$ is greater than the ordinary velocity $v_o$. For light with a wave normal parallel to $s$, there are two normal modes of propagation. The ordinary wave is plane polarized so that optical D vector is normal to the plane of the figure. The extraordinary wave travels with a velocity $v'_e$, and is linearly polarized with the optical D vector in the plane of the figure.

In FIG. 2 is shown the corresponding diagram for a "cubic" magnetic crystal, i.e., one which would be cubic were it not for a spontaneous magnetization. Here, for light traveling parallel to M, there are two circularly-polarized normal modes of propagation. The difference between the two velocities corresponds to the circular magnetic birefringence, indicated as CMB. For light traveling perpendicular to M, the two normal modes are linearly polarized parallel and perpendicular to M, and the difference between them corresponds to the linear magnetic birefringence, indicated as LMB. For light traveling in a general direction neither parallel nor perpendicular to M, the normal modes are elliptical. The way in which the ellipse ranges from linear to circular depends on the properties of the crystal as reflected in the separation of the wave normal surfaces parallel and normal to the magnetization.

Thus, when light propagates through a "cubic magnetic crystal" in a direction perpendicular to the magnetization M, it is found that the two linear polarizations, one parallel and one perpendicular to M, travel with different velocities. The linear magnetic birefringence is small; a retardation of the order of one wavelength per centimeter is typical for garnets in the near infrared. However, the maximum circular magnetic birefringence associated with garnets (and responsible for rotation of the plane of polarization of linearly-polarized wave energy transmitted therethrough) is of the same order of magnitude. Thus, in a structure in which M and the applied magnetic field are neither parallel nor perpendicular, the fact of LMB must be taken into account.

When the CMB and the LMB are comparable, the normal propagation modes for a generalized magnetic field direction are substantially elliptical. However, if the LMB can be made small, the normal modes will be circular and can be easily added in any phase to produce linear polarization.

There are many optical devices which use garnet materials with a magnetic field applied along general directions. These devices include modulators, such as disclosed in the copending, commonly-assigned application of R. C. Le Craw, Ser. No. 543,318, filed Apr. 18, 1966, and many versions of the magnetic laser. The effects of LMB present in the output wave in such devices is oftentimes undesirable.

A typical garnet modulator is shown in FIG. 3 in which the element shown consists of crystalline body 1 of substituted iron-containing ferrimagnetic garnet. Provision is made for introduction of light beam 2 at surface 3 and for extraction of light beam 4 at surface 5. The orientation of the crystal is such that light transmission is along a [100] crystallographic direction. A direction normal to light transmission, illustratively in the plane of the representation, defines a [110] crystallographic direction. Magnetic means (not shown) is provided for magnetically saturating crystalline body 1. Arrow 6 is intended to depict at least a component of this applied field. Modulation is achieved by introducing a magnetic field component in the light transmission direction. This may be accomplished by passing a current through winding 7 from a source not shown.

It has been indicated that the orientation of the crystal is critical. The anisotropy energy surface in the garnet has a saddle point along the [110] axis. This anisotropy field, which resists tilting of the magnetization in a plane normal to the page, effects an increase in the ferromagnetic resonance frequency for any given applied field, thereby permitting increased frequency operation. While tilting in this direction is impeded, the existence of easy directions of magnetization [111] in the plane of the page results in a tendency of the magnetization to tilt in the plane of the page.

In operation, crystalline body 1 is magnetically saturated in an illustrative case by a normal magnetic field 6. The field applied may advantageously exceed the value required to saturate. For this exemplary mode of operation, a plane polarized light beam 2, polarized parallel or perpendicular to field 6, introduced at surface 3 passes through body 1 unchanged. Introduction of current through winding 7 tilts the magnetization, thus producing a magnetization component in the light transmission direction. The magnitude of this component determines the degree of rotation, or of phase retardation, or of frequency change, depending upon the system. In an uncompensated crystal, however, the tilted magnetization produces the above-discussed linear magnetic birefringent effects. Regardless of the mode of operation, the degree of modulation may be enhanced by use of optional, partially-reflecting surfaces 8 and 9. The resulting cavitation permits retention of the light beam for a given statistical number of passes during each of which the modulation is increased. Since the power required to increase modulation in a given crystal length for a single pass varies as the square of the degree of modulation, the advantage from this standpoint is significant.

In the class of materials here under consideration, the rare earth iron garnets, there are several possible theoretical origins of LMB. They may be catalogued as (1) exchange or spin orbit splitting of the iron ion; (2) exchange splittings of rare earth, sharp line transitions; (3) exchange or spin orbit splittings of rare earth-allowed transitions; (4) ferromagnetic resonance and exchange resonances; and (5) magnetostrictive distortion of the lattice. Investigation shows that it is the latter of the above, magnetostrictive distortion, from which the major part of the LMB effect arises.

The form of the dielectric tensor appropriate for a medium such as rare earth iron garnet, which is optically isotropic except for the magnetization is:

$$\underline{\underline{\epsilon}} = \begin{pmatrix} \epsilon_\perp & -i\epsilon_2 & 0 \\ i\epsilon_2 & \epsilon_\perp & 0 \\ 0 & 0 & \epsilon_\| \end{pmatrix} \quad (1)$$

Here M is taken parallel to the z-axis. By setting $$\epsilon_\|$$

distinctly different from $$\epsilon_\perp$$

we make it possible to include the important case of a uniaxial distortion parallel to M. From general statistical considerations, it can be shown that the diagonal terms are even in M and the off diagonal terms are odd in M. In general, $$\epsilon_\perp, \epsilon_\|, \text{ and } \epsilon_2$$

are complex, but if the medium is nonabsorbing, the matrix is Hermitian, and all three are real. All the elements are functions of frequency. The elements of this tensor are to be obtained from the dipole moments connecting the occupied ground states and possible excited states. It should be noted that both electric and magnetic dipole transitions may contribute to magneto-optical effects, and in some crystals transitions associated with several different ions may all have significant contributions.

In terms of the elements of the dielectric tensor, the refractive indices for a light beam traveling along y in a medium magnetized along z are:

$$n_\| = \sqrt{\epsilon_\|}$$

$$n_\perp = \sqrt{\frac{\epsilon_\perp^2 - \epsilon_2^2}{\epsilon_\perp}} \quad (2)$$

The magnetic birefringence resides in the fact that these refractive indices are different. The actual retardation $r$ per unit length $l$ of one wave with respect to the other is given by:

$$r/l = (n_\| - n)/n_o \quad (3)$$

Suitable units would be microns per centimeter.

The magnetic linear birefringence, closely related to the Cotton-Mouton effect, is represented by the difference $$n_\| - n_\perp$$

given in Equation 2. Assuming only that $$\epsilon_2 \ll \epsilon_\perp$$

we write $$n_{\parallel}-n = \sqrt{\epsilon_{\parallel}} - \sqrt{\epsilon_{\perp}} + \frac{1}{2}\sqrt{\epsilon_{\perp}}\left(\frac{\epsilon_2}{\epsilon_{\perp}}\right)^2 \quad (4)$$

Experiments to measure the LMB associated with the rare earth iron garnets have been carried out.

These measurements of LMB were made using a straightforward scheme in which light from a monochromator was passed through a filter to guarantee that only one order was present. The light is linearly polarized by a Glan-Thompson prism set at an azimuth of $-45°$, and chopped at 400 c.p.s. It was then passed through the garnet sample which was placed in saturating field with an azimuth of 0°. Upon exiting the sample, the light was passed through a Babinet-Soleil compensator with its axis along 0°, and thence through a second Glan-Thompson prism with its axis at $+45°$, the analyzer. Light passing through this train was detected by a cooled photomultiplier.

The measurement procedure involved the simple introduction of enough retardation with the compensator to counterbalance that associated with the magnetization. This was done by setting the compensator to reduce the photomultiplier signal to a minimum. The measurements were made at 300° K. and at 700° K. with the garnet sample immersed in liquid nitrogen. The spectral range was in the near infrared where the ferrimagnetic garnets are very transparent.

The birefringence data obtained are presented in FIG. 4 of the drawing. It can be seen that the retardation per unit length is in most cases constant with wavelength, and thus can be represented by a single value $R_{111}$ or $R_{100}$ depending on whether M is parallel to [111] or to [100]. Table I gives $R_{100}$ and $R_{111}$ at 77° K. and 300° K. for all of the rare earth iron garnets except VbIG and LuIG, for which samples were not obtained. In the case of DyIG at 77° K., fields available were insufficient to saturate the sample, and a value for $R_{100}$ could not be extracted for the table.

From the table in FIG. 4 it can be readily seen that retardations of both positive and negative senses appear at 77° K. By thus selecting the compositions of the rare earths in an yttrium iron garnet crystal, the effective $R_{111}$ and $R_{100}$ can be made zero. When the retardation of the composite crystal is reduced to zero or substantially zero, the linear magnetic birefringence is likewise reduced to zero or substantially zero, and the undesirable effects of such birefringence are eliminated.

For example, the YIG laser, which is operated at liquid nitrogen temperatures, contains holmium, erbium, and thulium. The emission is from the holmium ions, while the others serve to absorb energy. Considering a YIG (Ho, Er) laser composition which is to have $$R_{111} = R_{100} = 0$$

and using the table of FIG. 4, $$R_{111}^{Y} = -0.83 \quad R_{100}^{Y} = -0.61$$
$$R_{111}^{Ho} = 1.95 \quad R_{100}^{Ho} = 2.38$$
$$R_{111}^{Er} = -0.43 \quad R_{100}^{Er} = -0.64$$

If $x$ and $y$ are fractions of Y sites occupied by Ho and Er, we have $$(1-x-y)(-0.83) + x(1.95) + y(-0.43)$$

and $$(1-x-y)(-0.61) + x(2.38) + y(-0.64) = 0$$

Solving, $$x = 0.21$$

and $$y = 0.61$$

which indicates that a YIG material, in which 21% of the yttrium lattice sites are occupied by holmium and 61% of the yttrium lattice sites are occupied by erbium, will exhibit zero linear magnetic birefringence in the presence of an external magnetic field applied in a general direction. Such lattice site substitution can be accomplished by placing a starting mixture of the following materials in a 100 cc. platinum crucible:

|   | Grams |
|---|---|
| $Y_2O_3$ | 2.88 |
| $Ho_2O_3$ | 3.36 |
| $Er_2O_3$ | 9.75 |

The crucible is covered with a platinum lid, placed in a globar furnace, and heated to 1300° C. for four to six hours. It is then slowly cooled at a rate of 1° to 5° per hour. At 1000° C., the crucible is removed from the furnace and allowed to cool to room temperature. Crystals are extracted by immersing the crucible in a mixture of one volume of concentrated nitric acid ($HNO_3$) and three volumes of water. Many more details are given in J. P. Remeika's U.S. Pat. 3,079,240.

The modulator of FIG. 3 can be likewise rendered free from LMB by a lattice substitution similar to that described for the YIG laser above. In such a system, the modulating element for 300° K. operation could be, for example, a single crystal of $$(Y_{.22}Dy_{.43}Tb_{.22})_3Fe_5O_{12}$$

Such a modulating system then would be as depicted in FIG. 5 and would consist of laser oscillator or coherent light source 30 producing light beam 31, which passes through plane polarizer 32, focusing means 33, rare earth-YIG mixed garnet modulator 34, analyzer 35, and finally into detector 26, in succession. The crystallographic directions within element 34 are such as to permit transmission of light in a [100] direction, and such as to provide for a [110] axis, these directions together defining the plane within which the saturating magnetic field 38 is applied. Modulating current, introduced through winding 37, results in rotation of the plane-polarized light beam to a degree dependent upon the magnitude of the component of magnetization lying in the transmission direction. In common with other modulation apparatus, the relative polarization directions of elements 32 and 35 depend upon the desired mode of operation. They may be crossed so as to permit no transmission in the absence of a modulating current, or they may be parallel to permit maximum transmission in the absence of modulating current. They may at some intermediate angle for biased linear CW operation or for one mode of digital operation which, while resulting in some loss, may take advantage of a rotation of less than 90°.

In all cases it is to be understood that the described embodiments are merely illustrative of the principles of the invention. Numerous other embodiments, incorporating these principles, can be readily devised by those skilled in the art without departing from the spirit and scope of the invention.

What is claimed is:

1. An optical device comprising a magneto-optical body of a material in which a plurality of lattice sites are occupied by primary ions of a given retardation coefficient and the remainder of lattice sites are occupied by at least one other secondary ions having a resultant retardation coefficient opposite from said given coefficient, said secondary ions being of sufficient number to reduce the linear magnetic birefringence of said material essentially to zero; means for transmitting optical energy having a linearly polarized component through said body along a given axis, means for applying a magnetic field to said body having a component perpendicular to said axis, and means for receiving said energy.

2. An optical device in accord with claim 1 in which said material is an iron garnet and said ions are rare earths.

3. An optical device in accordance with claim 2 in which said primary rare earth ion is yttrium, and said secondary rare earth ions comprise holmium and erbium, with holmium occupying 21% of the lattice sites and erbium occupying 61% of the lattice sites.

References Cited

Krinchik, Magnetooptical Properties of Rare-Earth Ions in Ferromagnetic Crystals, Soviet Physics—Solid State, vol. 5, No. 2 (August 1963), pp. 273–277.

Suits et al., Magnetic Birefringence of EuSe, Physical Review Letters, vol. 14, No. 17 (Apr. 26, 1965), pp. 687–689.

DAVID SCHONBERG, Primary Examiner

P. R. MILLER, Assistant Examiner

U.S. Cl. X.R.

252—62.57; 350—147, 150, 157